Figure 1:
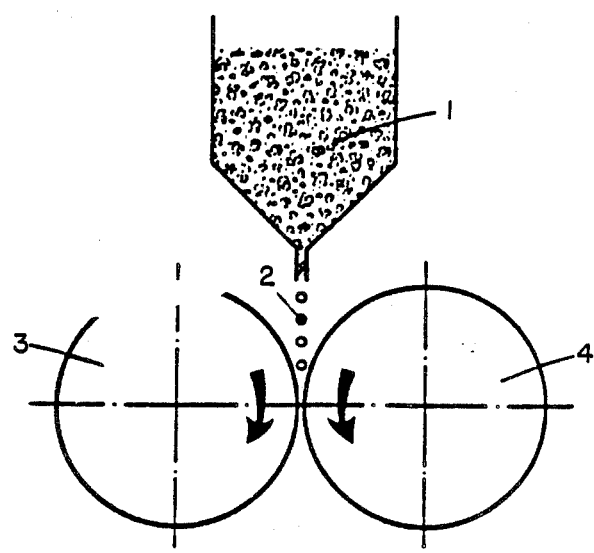

United States Patent [19]

Huether

[11] Patent Number: 4,784,335
[45] Date of Patent: Nov. 15, 1988

[54] FINELY DIVIDED POWDER AND PROCESS AND APPARATUS FOR TREATING THE SAME

[75] Inventor: Werner Huether, Karlsfeld, Fed. Rep. of Germany

[73] Assignee: MTU- Motoren- Und Turbinen-Union München GmbH, Munich, Fed. Rep. of Germany

[21] Appl. No.: 805,713

[22] Filed: Dec. 6, 1985

[30] Foreign Application Priority Data

Dec. 8, 1984 [DE]  Fed. Rep. of Germany ....... 3444847

[51] Int. Cl.⁴ .............................................. B02C 1/00
[52] U.S. Cl. ..................... 241/20; 241/227; 241/277; 241/259.1; 241/295; 419/33; 419/62
[58] Field of Search ................... 241/16, 20, 277, 227, 241/295, 259.1; 419/62, 33

[56] References Cited

U.S. PATENT DOCUMENTS

| 3,099,080 | 7/1963 | Worn | 29/420 |
| 3,498,549 | 3/1970 | Sauer | 241/226 |
| 4,076,177 | 2/1978 | Hirayama et al. | 241/32 |
| 4,094,470 | 6/1978 | Waldhofer | 241/46.02 |
| 4,131,238 | 12/1978 | Tarpley | 241/30 |
| 4,226,634 | 10/1980 | Dimroth et al. | 241/22 |

FOREIGN PATENT DOCUMENTS 1010163 6/1952 France .
2299413 12/1973 France .
17087 10/1910 United Kingdom .

Primary Examiner—Stephen J. Lechert, Jr.
Attorney, Agent, or Firm—Barnes & Thornburg

[57] ABSTRACT

A process and apparatus for treating finely divided powders of brittle materials capable of sintering or injection molding, such as ceramics or intermetallic phases in a predetermined maximum size of the powder particles which is maintained with reliability.

25 Claims, 1 Drawing Sheet

FINELY DIVIDED POWDER AND PROCESS AND APPARATUS FOR TREATING THE SAME

The present invention relates to a process and apparatus for treating finely divided powders. As fine a powder as possible is desired, especially for materials capable of sintering or injection molding such as ceramics or inter-metallic phases.

However, the known manufacturing processes supply only medium grain sizes of the powders which, depending on the material, lie within the range of about 1 micrometer up to about 50 micrometers.

If particularly high demands are made of the strength properties of parts made of the aforementioned materials (brittle materials), the problem exists that the strength is determined to a considerable extent by the size of the existing texture defects or flaws.

Textural defects or flaws can be caused by (a) grains in the starting powder whose size exceed by a multiple the average grain size of the powder, (b) grains of foreign material whose size exceeds by a multiple the average grain size of the powder, (c) pores in the starting material which do not close during the processing, especially during sintering.

The closing of pores as in the last-named case, is costly even with the use of pressure and heat, as during hot isostatic pressing. However, in any case, the grains mentioned under (a) and (b) remain limiting the strength.

Attempts have already been made to remove undesired particles from powders by known separating methods such as air separation, sedimentation or the like. However, the known processes did not prove satisfactory, whereby under the term sedimentation are to be understood also those processes under gravity as also under centrifugal force, because undesirably large particles, even though of smaller concentration, are still present in the powder. The known processes, however, are technically expensive and involve large amounts of time as well as costs.

Accordingly, it is the object of the present invention to provide a process and apparatus which permits, respectively, permit to obtain finely divided powders, especially of the aforementioned materials in which the aforementioned undesirably large particles are eliminated.

The underlying problems are solved according to the present invention in that the powder particles are put into a suspension with high liquid and low solid proportion, the suspension is conducted through at least one roller pair which includes therebetween a predetermined fixedly adjusted gap that corresponds to the desired maximum size of the powder particles, the through-put thereof (volume per unit time) is matched to the roller movement and thereafter the powder particles are separated from the liquid in the suspension.

The most significant advantages of the present invention are as follows:

A separate classification by means of expensive separating processes and apparatus can be dispensed with.

The apparatus according to the present invention is of simple construction and permits a limitation of the maximum size of finely divided powders.

The powders manufactured in this manner are suitable in particular for ceramics or intermetallic phases capable of injection molding or sintering, whereby all types of sintering processes, such as pressureless sintering, reaction sintering as well as simultaneous application of high pressure and temperature (HIP) are to be understood by the term sintering process. "Injection molding" is to be understood to include also extruding and similar processes.

Figure 2:
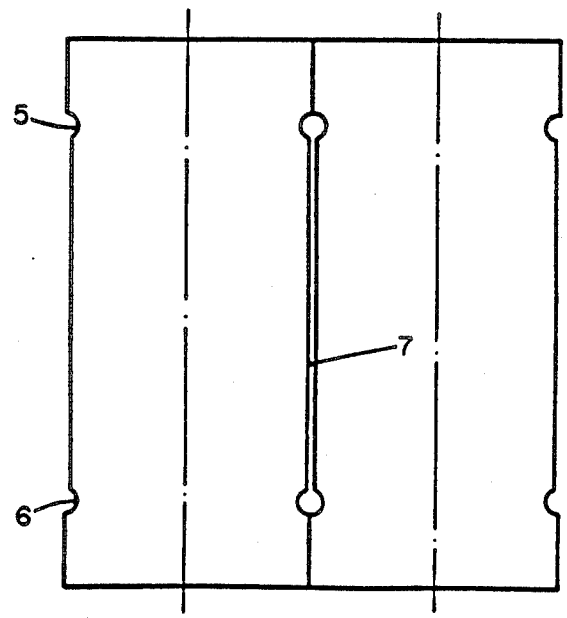

These and other objects, features and advantages of the present invention will become more apparent from the following description when taken in conjunction with the accompanying drawing which shows, for purposes of illustration only, one embodiment in accordance with the present invention, and wherein:

FIG. 1 is a schematic front elevational view of an apparatus in accordance with the present invention for processing powder; and FIG. 2 is a schematic plan view on the roller pair of the apparatus according to FIG. 1.

Referring now to the drawing, in the process according to the present invention, powder is dissolved in a liquid solvent with which it does not chemically react. The suspension is so adjusted that it exhibits a high liquid proportion and low solid proportion and the latter amounts to 25% and less, especially to 10% and less. It is particularly advantageous to select the concentration of solid particles in the liquid in such a manner that the average distance of the particles in the suspension lies within the range up to 100 times, preferably up to about 2 to 50 times the average particle size of the powder.

This suspension is conducted through a roller pair with an adjustable gap which is readjusted according to the operating duration, i.e., to the carrying out of the operating process of powder manufacture. The suspension which has been made and/or collected in the container 1, drips down as droplets 2 into the gap between the rollers 3 and 4 which are advantageously driven in opposite directions. The feed of the suspension and the drive of the rollers is so adjusted that the suspension is drawn safely through the roller gap before it can drain off laterally.

It is achieved thereby that the excessively large particles in the powder are drawn into the roller gap and are comminuted and crushed approximately to the width of the roller gap.

It is advantageous if the suspension drips off from the rollers without reaching the surfaces, along which the rollers are pressed against one another. For that purpose, ring-shaped recesses may be provided in addition to the roller running or contact surfaces. This involves the circumferential grooves 5 which delimit the surfaces 6 that are located axially outwardly, along which the rollers run up against one another. The roller gap 7 can be seen between the annular grooves 5. The roller gap 7 is smaller than 50 $\mu$m, preferably smaller than 25 $\mu$m (adjustable).

In order to be able to maintain very accurately the desired gap width with very fine roller gaps, the rollers are pressed against one another along the wall end areas where are also provided the running or contact surfaces of the rollers. The gap which is formed by the recess in the center part either of one or of both rollers is predeterminable and possibly adjustable by way of the outwardly disposed running or contact surfaces (wheels) which may possibly be provided with a suitable yielding abutment layer or with other types of elastically yielding or springy or other adjusting means of mechanical type, of any known manner. Such mechanical adjusting means are provided already, as such, in comminuting apparatus such as grinding units and the like.

As a result of the great thinning of the powder in the suspension, it is assured that only few of the excessively large particles—above a predetermined maximum size—are present simultaneously at any time in the gap. The forces which the particles exert on the rollers before they are comminuted, therefore do not suffice to enlarge the roller gap, for example, by pressing the rollers apart to such an extent as would interfere. The rollers are preferably driven in opposite direction by an electric motor, i.e., one roller in the clockwise direction and the other in the counterclockwise direction, however, with the same rotational speed and with a relatively high circumferential velocity in comparison to the feed velocity of the suspension. The control, respectively, regulation of the electric motor or motors, possibly of gear motors, is also of any conventional, known type. The person skilled in the art can select the same in such a manner that they are matched to the aforementioned purpose that is to be achieved.

After the powder particles have been brought to the predetermined maximum size, i.e., again leave the rollers, they are dried and collected. The liquid was separated beforehand (by discharge especially centrifuging from the annular grooves) or subsequently.

The process and the apparatus according to the present invention find particular application for the manufacture of powders for sintered parts or injection molded parts of materials such as ceramics (SiC, $Si_3N_4$), ($Al_2O_3$, MgO, $ZrO_2$, AlN) or intermetallic phases (TiAl, $TiAl_3$, $NiAl_3$, NiAl, $Ni_3Al$, $Ti_5Si_3$, FeSi). The powders thereof can be obtained prior to the mixing or dissolution in a container or chamber or the like by atomization through a nozzle or rotary comminution, especially of melted droplets or by another chemical and/or physical approach of the fragmentation of particles such as fine grinding. Structural parts can be obtained with materials made with the process according to the present invention from powders that are processed such as sintered or injection molded into objects, which are of high strength, i.e., especially high heat-resistant, erosion-resistant and corrosion-resistant, respectively, chemically stable. Such structural parts, in addition to the aforementioned requirements, must also withstand mechanical loads and stresses, especially in mechanical engineering, as are caused by centrifugal forces, pressure and others.

The following are typical examples of the present invention:

APPARATUS FOR PROCESSING

The apparatus for processing finely divided powders and for carrying out the process includes a container in which a discharge opening, especially having a metering valve (not shown) or at least an adjustable cross section is arranged accurately in the center above the gap between the roller pair. A conventional stirrer or mixer of known type may also be arranged in the container which can also be designated as mixing, respectively, dissolving chamber; additionally, tempering means or other conditioning means may be coordinated to the container if so desired. The container may be constructed open or adapted to be closed. The roller pair whose drive is not shown, may be made, for example, of the same material as the powder to be conditioned. However, it does not include a surface layer of this material. The advantage of similar material resides in the fact that any eventual roller wear is similar to the processed powder.

If extremely small powder particles are required, the suspension passes sequentially through several rollers or roller pairs. It is assured thereby that in case one of the excessively large particles passes through the first rollers, due to local roller wear thereof, it is then comminuted in the following rollers. In case contamination or impurities are present in the powder, which cannot be comminuted in the rollers, these impurities must be separated beforehand by other methods (known separating methods).

Impurities or contaminations may be, for example, metallic particles which can be plastically deformed in the roller gap. These metallic particles can be washed out wet-chemically.

Organic particles which can be elastically or plastically deformed, can be converted into carbon by a heat treatment at 600° C., possibly in a protective gas atmosphere. The carbon is comminuted reliably in the roller gap. In case the nature of the organic contamination is known, the same can be washed out with a solvent. After passing through the roller gap or gaps, the suspension can be atomized through a nozzle in a cooling tower and possibly dried.

POWDER

Example No. 1 Silicon carbide powder, of average grain size ( <2 μm) of specific surface ∼15 $m^2/g$ is cleaned beforehand, especially is washed with hydrofluoric acid so that no metallic impurities or contaminants are present any longer. A heat treatment of the powder in an argon atmosphere at about 600° C. follows thereafter, in which the organic contaminants are eliminated. Thereafter a suspension of the powder in water is made (200 gr powder in 1 liter). The suspension sequentially passes through three roller gaps with a width of 10 μ, a roller diameter of about 50 mm, and a roller width of about 200 mm. The roller material: silicon carbide or materials of a similar high E-modulus and similar high wear strength, such as tungsten carbide, silicon nitride, agate, however, these materials or other roller base bodies can be coated with hard materials such as titanium nitride, titanium carbide and boron carbide.

Example No. 2

A $TiAl_3$ powder with an average grain size of 5 μm serves as starting powder. The powder is pretreated, for example, washed for the pretreatment in a conventional manner. A heat treatment under a protective gas atmosphere at about 600° C. takes place subsequently for evaporating organic contaminants.

Thereafter a suspension of the powder is made in ethanol at the ratio of 100 gr powder to 1 liter liquid.

The suspension passes sequentially through three roller gaps with a gap width of 25 μm, a roller width of 300 mm and a roller diameter of 80 mm. Roller material: tungsten carbide or a roller base body coated with titanium nitride. Thereafter, the powder is atomized in a cooling tower and is dried thereby. The collected powder is then subsequently further treated, for example, sintered, pressed, especially hot-pressed into objects of desired type and shape. With advantage: application for high strength structural parts of mechanical and chemical apparatus design, especially highly stressed parts of force and work machines such as fluid-flow engines, especially turbines.

Various modifications are readily feasible within the scope of the present invention. For example, a wiper installation coordinated to the roller or rollers which is adjustable to a gap that amounts to about 10% of the roller gap and thus enables a microsedimentation. In lieu of sedimentation, the separation can also be carried out with the aid of a centrifugation.

While I have shown and described only one embodiment in accordance with the present invention, it is understood that the same is not limited thereto but is susceptible of numerous changes and modifications as known to those skilled in the art. For example, the present invention is suitable also for applications other than those described. Additionally, the combinations and subcombinations described herein may be modified as known to a person skilled in the art, both with respect to one another as also with respect to known features. Accordingly, I do not wish to be limited to the details shown and described herein but intend to cover all such changes and modifications as are encompassed by the scope of the appended claims.

I claim:

1. A process for eliminating undesirably large particles in powders of brittle materials capable of sintering or injection molding, comprising the steps of
   placing the powder particles into a suspension having a concentration of solid particles in a liquid solvent with which it does not chemically react such that the average distance between the particles in the suspension lies within the range up to 100 times the average particle size of the powder,
   conducting the suspension through at least one roller pair which includes therebetween a predetermined fixedly adjusted gap that corresponds to the desired maximum size of the powder particles, a minor portion of said powder particles being greater in size than the gap and a major portion of said powder particles being substantially smaller in size than said gap, matching the through-put thereof to the roller movement, and thereafter separating the powder particles from the liquid in the suspension.

2. A process for treating finely divided powders of brittle materials according to claim 1, wherein the materials are ceramics or intermetallic phases.

3. A process for treating finely divided powders according to claim 1, in which the particles are obtained by atomization or rotary comminution of fused droplets or by other comminution such a fine grinding with subsequent classification of the collected powder particles.

4. An apparatus for eliminating undesirably large particles in powders of brittle materials, comprising container means, controllable discharge means underneath the container means for establishing and maintaining a suspension having a concentration of solid particles in a liquid solvent with which it does not chemically react such that the average distance of the particles in the suspension lies within the range up to one hundred times the average particle size of the powder, at least one roller pair defining therebetween a gap that corresponds to the desired maximum size of the powder particles, each said roller of said at least one roller pair including two oppositely disposed outer areas in which each said roller has a first diameter, at least one of said rollers of said at least one roller pair including a central area in between each of said oppositely disposed outer areas in which said at least one roller has a second diameter less than said first diameter, said rollers of said at least one roller pair contacting one another in said outer areas, a portion of said powder particles being greater in size than the gap, said roller means being rotated in opposite directions, said discharge means being located above said gap and dispensing the suspension in limited quantity at a given time directly into the gap.

5. An apparatus according to claim 4, wherein the gap between the roller means is sealed off against the outside.

6. An apparatus according to claim 5, wherein the gap can be preliminarily adjusted.

7. An apparatus according to claim 5, wherein the gap includes a circumferential groove between the roller means for discharging liquid.

8. An apparatus according to claim 7, wherein the roller means are so driven that the centrifugal forces serve for the discharge of the liquid.

9. An apparatus according to claim 8, further comprising wiping means coordinated to the roller means.

10. An apparatus according to claim 9, wherein the wiping means is arranged at a distance of about 10% of the roller gap relative to the roller means for purposes of microsedimentation.

11. An apparatus according to claim 10, wherein the roller means consist at least superficially of a material similar to the powder to be processed.

12. An apparatus according to claim 10, wherein the roller means consist at least superficially of a material identical to the material to be processed.

13. An apparatus according to claim 10, wherein the roller means consist partly of a material at least similar to the material to be processed.

14. An apparatus according to claim 10, wherein the roller means consist completely of a material similar to the material to be treated.

15. An apparatus according to claim 1, wherein the roller means are so driven that the centrifugal forces serve for the discharge of the liquid.

16. An apparatus according to claim 1, further comprising wiping means coordinated to the roller means.

17. An apparatus according to claim 16, wherein the wiping means is arranged at a distance of about 10% of the roller gap relative to the roller means for purposes of microsedimentation.

18. An apparatus according to claim 1, wherein the roller means consist at least superficially of a material similar to the powder to be processed.

19. An apparatus according to claim 1, wherein the roller means consist at least superficially of a material identical to the material to be processed.

20. An apparatus according to claim 1, wherein the roller means consist partly of a material at least similar to the material to be processed.

21. An apparatus according to claim 1, wherein the roller means consist completely of a material similar to the material to be treated.

22. A process according to claim 1, wherein the conducting of the suspension through at least one roller pair includes a gap therebetween having a width less than 50 $\mu$m.

23. An apparatus as in claim 4, wherein the gap has a width less than 50 $\mu$m.

24. A process for eliminating undesirably large particles in powders of brittle materials capable of sintering or injection molding, comprising the steps of
   placing the powder particles into a suspension having a concentration of solid particles in a liquid solvent with which it does not chemically react such that the average distance between the particles in the suspension lies within the range up to 100 times the average particle size of the powder, conducting the suspension through at least one roller pair which includes therebetween a predetermined fixedly adjusted gap that corresponds to the desired maximum size of the powder particles, a portion of said powder particles being greater in size than the gap, matching the through-put thereof to the roller movement, and thereafter separating the powder particles from the liquid in the suspension, and maintaining said gap by including contact surface areas oppositely disposed on outer ends of each roller of said at least one roller pair having a first diameter at which each said roller of each at least one roller pair are pressed against one another, said gap being disposed in between said contact surfaces of each outer end in a central area of each said at least one roller pair, at least one roller of said at least one roller pair having a second diameter in said central area less than said first diameter.

25. A process according to claim 1, wherein said conducting of the suspension through said gap includes a gap having a width five times greater than an average size of said powder.

* * * * *